United States Patent Office.

THOMAS H. W. UPSHUR, M. D., OF NORFOLK, VIRGINIA.

Letters Patent No. 82,046, dated September 8, 1868.

IMPROVED MEDICAL COMPOUND.

The Schedule referred to in these Letters Patent and making part of the same.

TO ALL WHOM IT MAY CONCERN:

Be it known that I, THOMAS H. W. UPSHUR, M. D., of Norfolk, in the county of Norfolk, and State of Virginia, have invented a new and valuable Improvement in Remedies for the Disease called Piles or Hemorrhoids; and I do hereby declare that the following is a full, clear, and exact description of my said improvement.

I take one drachm of the refined extract of coffee, and one scruple of powdered (Turkey) opium, and mix them in a Wedgewood mortar, and continue to triturate them together with the pestle until they are thoroughly pulverized. I then add, in a cold state, one ounce simple cerate, and one ounce hog's lard, and triturate the whole with the pestle until the whole is a conglomerate mass. When this is done, the medicine is ready for use.

In warm weather the lard may be dispensed with, either in whole or in part, inasmuch as the office of that ingredient is simply to keep the other components from becoming too hard. The simple cerate answers all purposes which the lard effects, provided the weather be sufficiently warm.

What I claim as my invention, and desire to secure by Letters Patent, is—

A medicine for piles, compounded of the ingredients, in the manner, and substantially of the proportions herein specified.

August 15, 1868.

THOS. H. W. UPSHUR, M. D.

Witnesses:
　N. W. SMALL,
　G. W. GRAY.